Patented Jan. 19, 1937

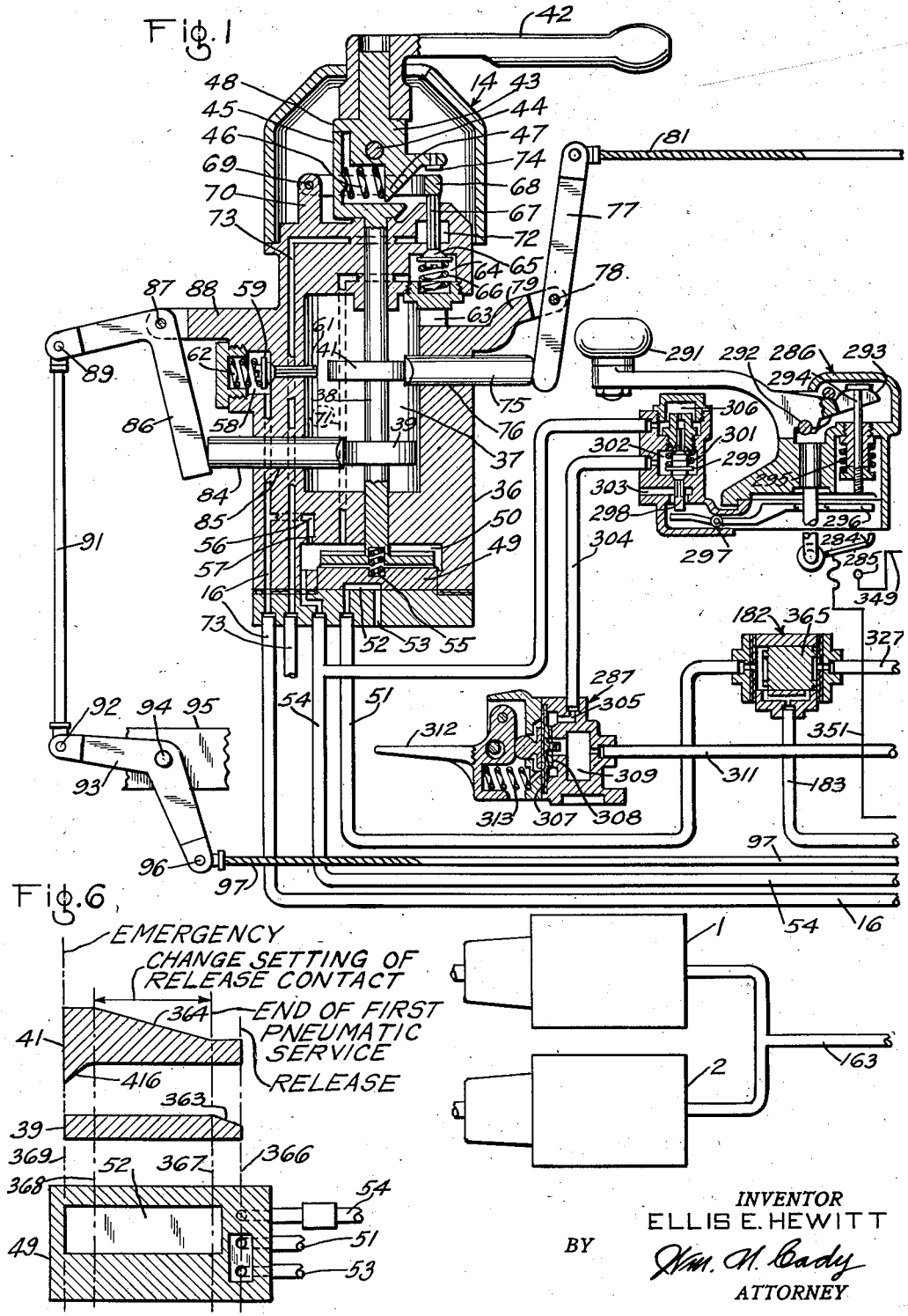

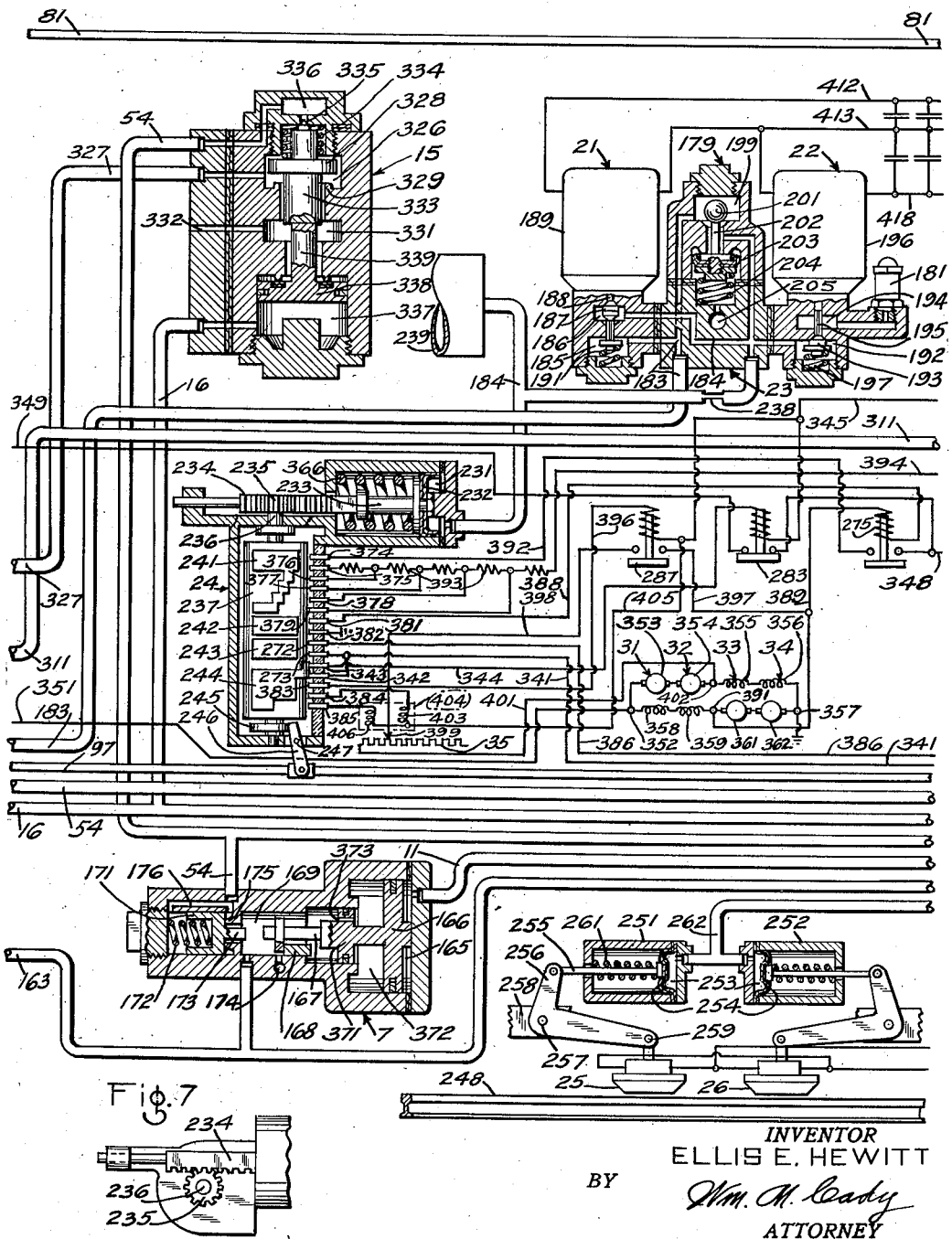

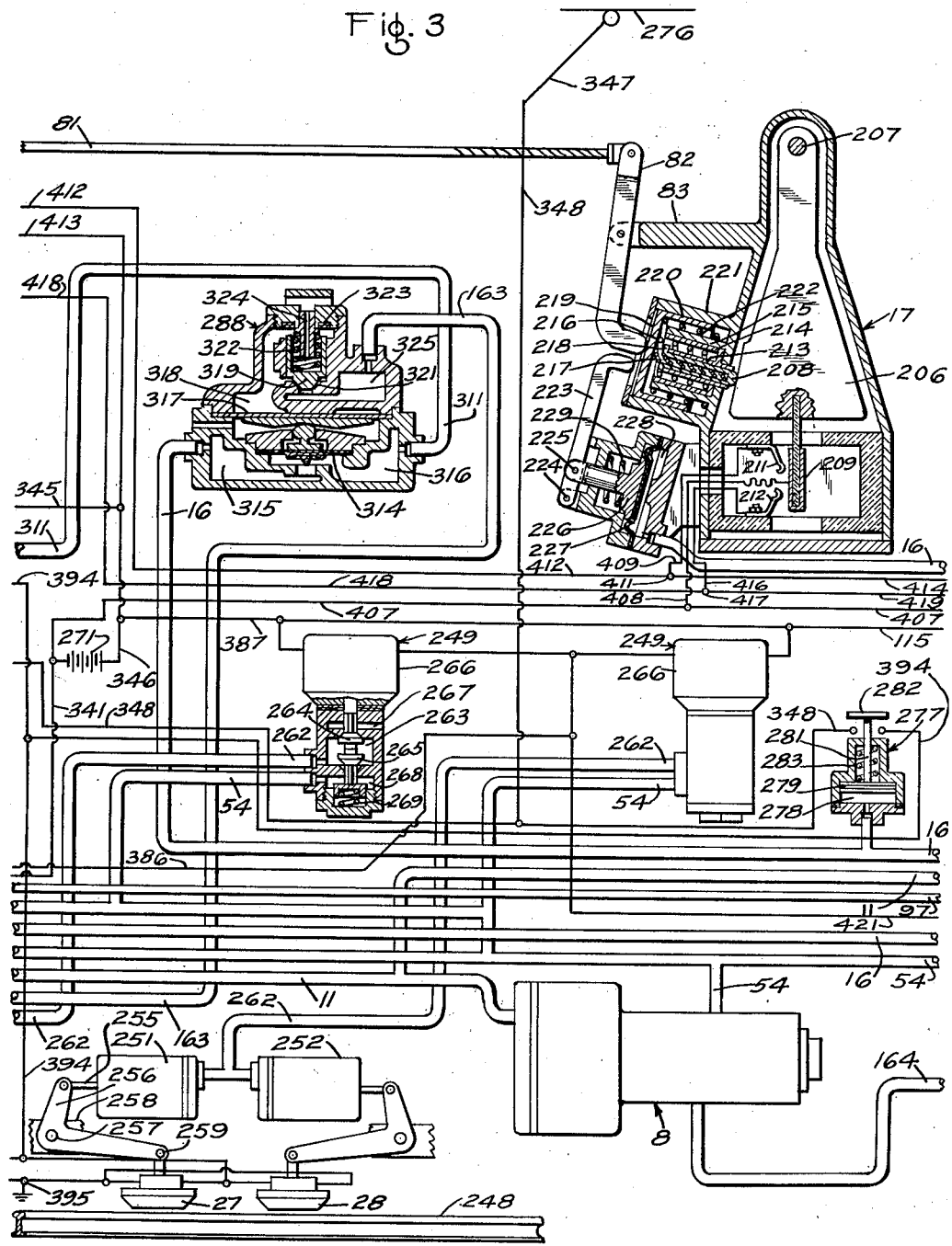

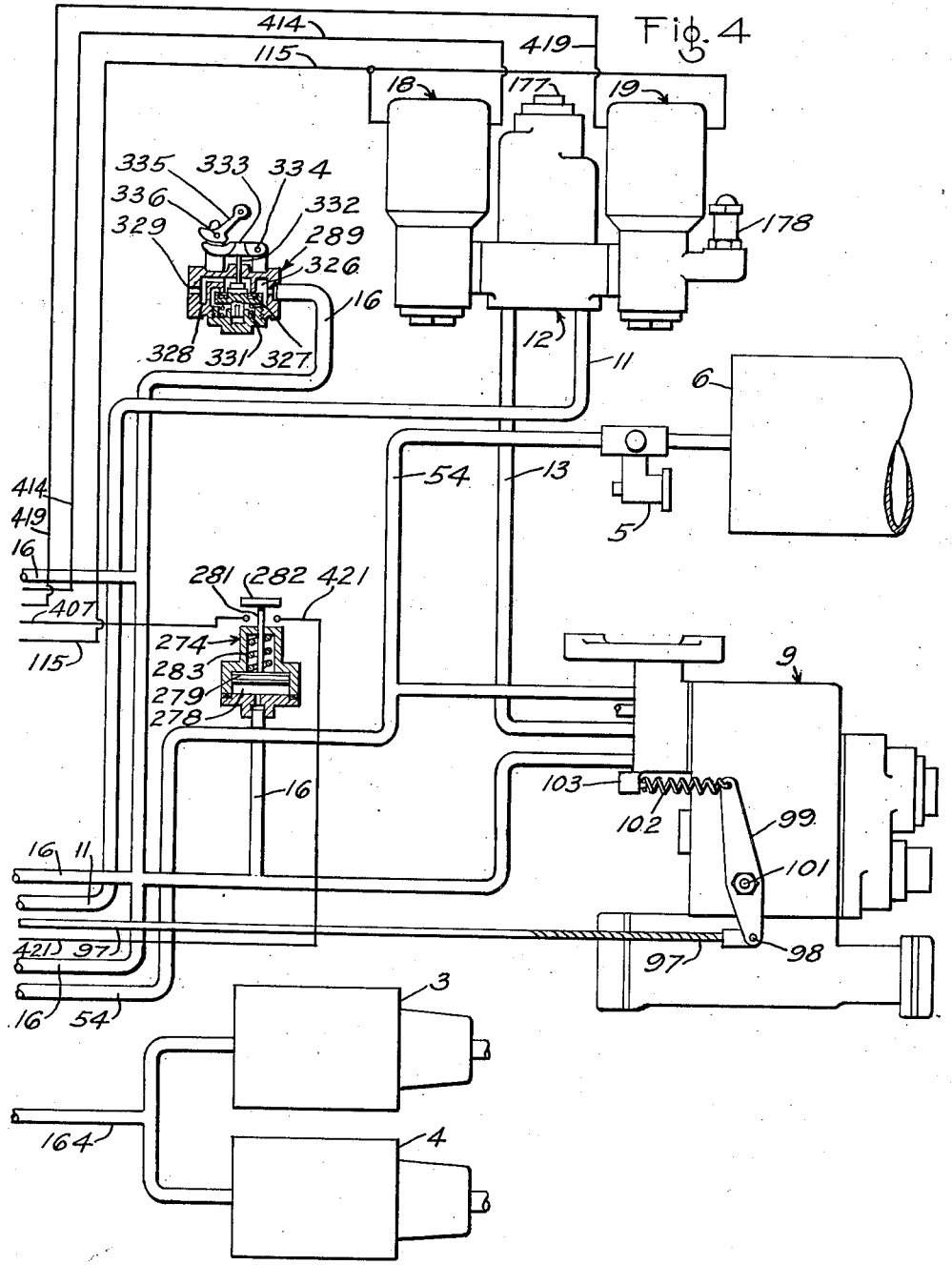

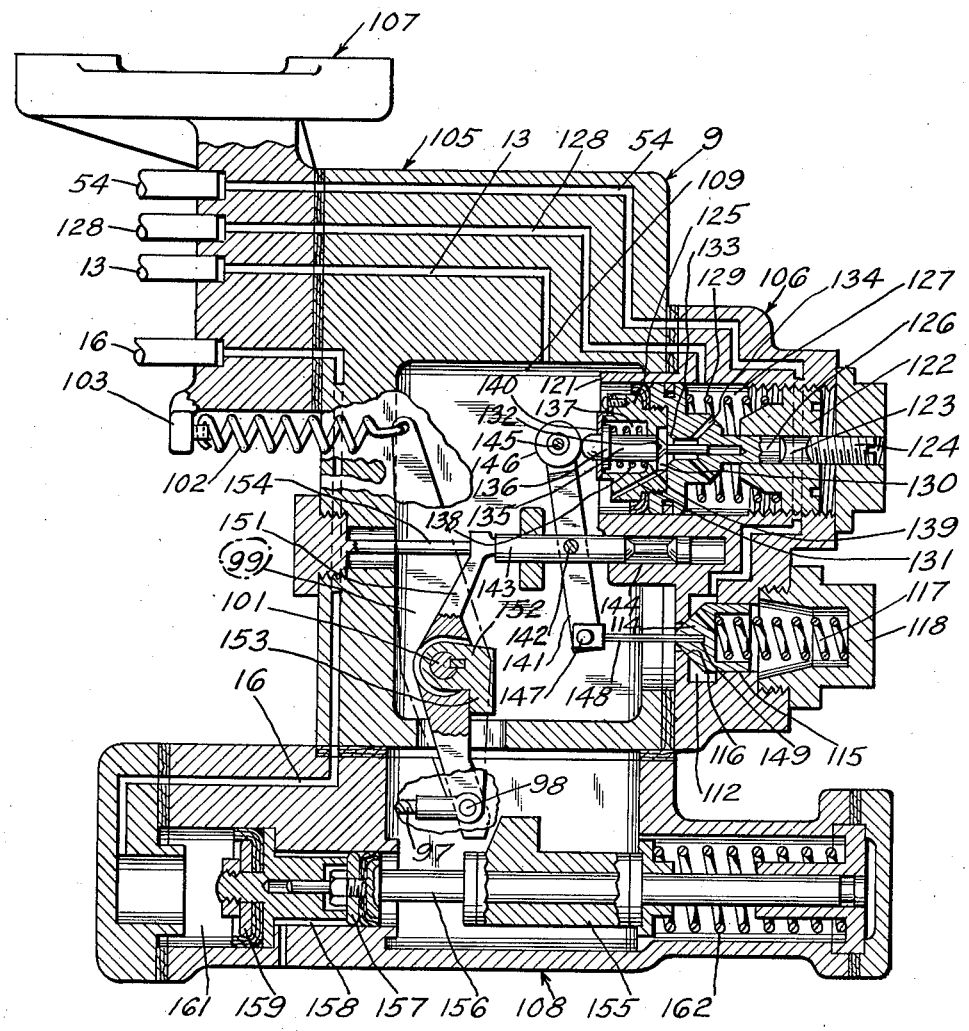

2,068,338

UNITED STATES PATENT OFFICE 2,068,338

BRAKE CONTROL SYSTEM

Ellis E. Hewitt, Edgewood, Pa., assignor to The Westinghouse Air Brake Company, Wilmerding, Pa., a corporation of Pennsylvania Application January 30, 1935, Serial No. 4,008

33 Claims. (Cl. 303—3)

My invention relates to braking equipment for railway vehicles and is particularly adapted for use on high speed traction vehicles driven by electric motors.

In the operation of high speed trains and similar vehicles it is desirable to provide a brake equipment having ample braking capacity to take care of the most rigid requirements the equipment may be called upon to meet. It is well known that for a given braking pressure friction type brakes are less effective in retarding the motion of a vehicle at high speeds than at low speeds because the coefficient of friction between the rubbing parts is lower at high speeds that at low speeds. In order to bring a vehicle to a stop quickly it has been the usual practice for an operator to apply the brakes with a high degree of braking pressure at the high speeds, and, as the speed of the vehicle decreases, to so operate the brakes as to cause the braking pressure to be decreased in such manner that the vehicle is brought to a stop quickly and smoothly without dangerous shock or skidding of the wheels.

Because of the difficulty of properly reducing the braking pressure at the desired rate it becomes desirable, in many instances, to provide a retardation controller for regulating the degree of application of the brakes. This may comprise an inertia responsive device, such as a pendulum, that assumes various positions in accordance with variations in the deceleration of the vehicle, and is adapted, by means of electric circuits, or otherwise, to control the degree of application of the brakes. A desirable type of brake equipment to use with high speed traction vehicles and railway trains is one employing both a brake for providing braking force to the wheels of a vehicle and a braking effect applied directly to the rails. The brake for applying a braking torque to the wheels of the vehicle may be the well known fluid pressure brake, an electric brake, or a combination of the two, while the track brake may be a magnetic brake controlled either by fluid pressure electrical means or by a combination of both means. In such an equipment a greater braking effect can be produced by operation of both the wheel and the track brakes than can be obtained by operation of either of them alone.

It is an object of my invention to provide braking equipment for railway vehicles in which a plurality of braking means are provided that are controlled from a common brake controlling device in accordance with a desired degree of braking.

It is another object of my invention to provide a retardation controlled braking system in which the braking pressure is automatically controlled by a retardation controller that is manually adjusted to provide a desired degree of retardation during a service operation of the brakes, and that is automatically adjusted to provide a greater rate of retardation upon an emergency operation of the brakes.

It is a further object of my invention to provide a braking system in which a plurality of brakes are employed and in which a retardation controller is employed for controlling all of said brakes in accordance with the rate of retardation of the vehicle.

It is a further object of my invention to provide a braking system employing a fluid pressure brake and an electrical brake for applying a braking torque to the wheels of a vehicle, and a brake for applying a braking effect directly to the track, and in which a retardation controller is employed for controlling a plurality of such brakes in accordance with the rate of retardation of the vehicle.

It is a still further object of my invention to provide a retardation controlled braking system in which electric braking means and fluid pressure braking means are employed, and in which deadman devices are employed for causing application of the brakes.

It is a further object of my invention to provide a retardation controlled braking system which is provided with safety control mechanism for automatically applying the brakes to effect a rate of retardation of the vehicle, upon failure of safety control pipe pressure, that is greater than the rate of retardation caused by normal service application of the brakes.

Other objects and advantages of my invention will be apparent from the following description of one preferred embodiment thereof, when taken in connection with the accompanying drawings, in which Figs. 1, 2, 3, and 4 when placed end to end from left to right, together constitute a diagrammatic view illustrating circuits and apparatus comprising one preferred embodiment of my invention.

Fig. 5 is a diagrammatic sectional view of the self-lapping brake valve device shown in Fig. 4.

Fig. 6 is a diagrammatic development of the brake valves and cams constituting portions of the brake valve device shown in Fig. 1, and, Fig. 7 is a plan view of the dynamic brake controller shown in Fig. 2.

Referring to the drawings and more particularly to Figs. 1, 2, 3 and 4 thereof in which brake apparatus is illustrated as employed in accordance with my invention on two train units. The apparatus comprises brake cylinders 1, 2, 3 and 4 by means of which the brakes are applied upon the flow of fluid under pressure thereto, as supplied by a feed valve device 5 from a main reservoir 6, as controlled by relay valve devices 7 and 8 that are governed in accordance with the operation of a self-lapping brake valve device 9, for controlling the supply of fluid under pressure to, and the release of fluid under pressure from, the application and release pipe 11, through the magnet valve portion 12 and the pipe 13 either in accordance with the operation of the brake controlling device 14 or in accordance with the operation of a deadman valve device 15 upon a predetermined retardation in pressure in a safety control pipe 16. A retardation controller 17 is provided for controlling the degree of application of the several brakes to limit the rate of retardation of the vehicle to a desired value by operation of the magnet valve devices 18 and 19 of the magnet valve portion 12 that are interposed between the application and release pipe 11 and the pipe 13 for controlling the pressure supplied to the brake cylinders, and by operation of the magnet valve devices 21 and 22 of the magnet valve portion 23 for controlling the operation of the pressure operated controller 24.

The braking equipment also includes magnetic track brake mechanism and dynamic braking equipment that are controlled by the controller 24, the magnetic track brake mechanism comprising the track shoes 25, 26, 27 and 28, and the dynamic braking mechanism comprising the vehicle driving motors 31, 32, 33 and 34, that operate as electric generators for supplying current to the dynamic braking resistor 35.

The brake controlling device 14 comprises a casing 36 enclosing a chamber 37 containing a shaft 38 carrying cams 39 and 41, that is controlled by an operating handle 42 that is connected to the shaft 38 through a handle supporting member 43 that is pivotally connected by means of a pin 44 to a bifurcated portion 45 of the shaft 38. A spring 46 is provided between the wall of the bifurcated portion 45 and a downwardly extending finger 47 on the handle supporting member 43 for biasing this member in a counter-clockwise direction about the pivot pin 44 until a finger 48 thereon is brought into engagement with the upper walls of the portion 45. A valve 49 is provided on the lower end of the shaft 38, within the valve chamber 50 in the lower portion of the casing member 36 in engagement with the valve seat, and is provided with a cavity 52 on its lower side, for connecting the pipe 51 to the atmosphere, through the exhaust port 53, or to the main reservoir pipe 54 to supply fluid under pressure from the main reservoir 6 to operate the controller 24. A spring 55 is provided in the lower end of the shaft 38 to force the valve 49 downwardly against its seat. The safety control pipe 16 is connected, through passage 56 and a restricted port 57, with the valve chamber 50 that is in communication with the main reservoir pipe 54, and is in communication with an emergency valve chamber 58 in the upper portion of the casing in which is provided an emergency pilot valve 59 having a stem 61 extending through a bore in the wall of the casing to be engaged by the cam 41. A spring 62 is provided in the emergency valve chamber 58 for forcing the emergency valve 59 to its seat. When the emergency valve 59 is forced from its seat by the cam 41, fluid under pressure is released from the safety control pipe 16 through the emergency valve chamber 58, chamber 37, and exhaust port 63 to the atmosphere.

A valve chamber 64 is also provided in the upper portion of the casing 36 for containing a sanding valve 65 that is urged to its seat by a spring 66, and is provided with an upwardly extending stem 67 that is shown in engagement with a ring member 68, that is pivotally mounted by the pin 69 in a bracket 70 extending upwardly from the casing structure 36. The sanding valve 65 controls communication between the sanding valve chamber 64, that is in communication with the valve chamber 50 through the passage 71, and a chamber 72, that is in communication with a sanding passage and pipe 73 that controls operation of a sanding mechanism, not shown. The sanding valve 65 is forced from its seat upon downward movement of the handle 42 which causes the handle supporting member 43 to move in a clockwise direction about the pivot pin 44, causing the contact element 74 to be forced downwardly against a ring 68 and thus forcing the stem 67 and the valve 65 downwardly against the pressure of the spring 66.

A pin 75 is provided, extending through a bore 76 in the wall of the casing 36 for engaging the cam 41, the outer end of which engages the lower end of the lever 77 that is pivotally mounted on a pin 78 supported in the bracket 79 extending outwardly from the casing 36. A cable 81 is attached to the upper end of the lever 77, and its opposite end is operatively connected to the upper end of a lever 82 mounted on the retardation device 17 that is operated to change the setting of the retardation device in a manner to be later explained.

A pin 84 is also provided in a bore 85 extending through the wall of the casing 36 for engaging the cam 39, the outer end of the pin 84 engaging the lower portion of a bell crank lever 86 that is pivotally mounted on the pin 87 carried by a bracket 88 extending outwardly from the casing 36. The outer end of the bell crank lever is pivotally connected, by the pin 89, to a rod 91 the lower end of which is connected, by a pin 92, to one end of a bell crank lever 93, that is pivotally supported by the pin 94 on any suitable supporting member 95, and the lower end of which is connected, by means of a pin 96, to a cable 97, that is operatively connected by the pin 98 to the lower end of a lever 99 on the brake valve device 9. The lever 99 is attached to a shaft 101 and is connected at its upper end to a spring 102 one end of which is attached to a lug 103 for biasing the lever 99 and the shaft 101 in a counter-clockwise direction.

The brake valve device 9, best shown in Fig. 5 of the drawings, may correspond to that disclosed and claimed in United States patent application of Ewing K. Lynn and Rankin J. Bush, for improvements in Brake valve devices, Serial No. 569,158, filed October 16, 1931, and assigned to the same assignee as this application.

The brake valve device 9 comprises a casing having a main body portion 105, a valve portion 106, a bracket portion 107 and an emergency portion 108. The valve portion, the main body portion, and the emergency portion together define a pressure chamber 109 that is in open communication, through the pipe and passage 13 and the application and release pipe 11, with the piston chambers of the relay valve devices 7 and 8. The magnet valve devices 18 and 19 of the magnet valve portion 12 are interposed between the pipes 13 and 11 to control the pressure of fluid acting on the piston of the relay valve devices 7 and 8 in accordance with the rate of retardation of the vehicle.

The valve portion 106 is provided with a supply valve chamber 112 to which a feed valve device 5 of the usual type supplies fluid under pressure at a reduced pressure from the main reservoir 6 through the main reservoir pipe 54. A supply valve 114 is contained within the supply valve chamber 112 and is slidably disposed within a bore 115 in the casing to engage a seat 116 carried by the valve portion of the casing. The valve 114 is subject to the pressure of a spring 117, one end of which engages the valve and the other end of which engages a nut 118 screw-threadedly attached within a bore in the valve portion of the casing.

The valve portion, or section, of the casing 106 is also provided with a cylinder 121 which is open at one end to the pressure chamber 109, the other end of the cylinder being closed by an adjusting member 122 screw-threadedly attached within a bore in the casing section. The adjusting member 122 is provided with a central bore 123 which, at its outer end, is tapped to receive a screw-threaded cap member 124.

Operatively mounted in the cylinder 121, adjacent to its open end, is a movable abutment in the form of a piston 125 having a stem 126 which is slidably guided by the adjustable member 122 within the inner end of the bore 123. At one end of the piston 125 is a chamber 127 which is constantly open to the atmosphere through passage and pipe 128. A coil spring 129 is contained in the chamber 127 and is interposed between and engages the inner face of the piston 125 and the inner face of the adjusting member 122.

A release valve chamber 130 is provided within the piston 125, and is in open communication with the pressure chamber 109 through a passage 131. A release valve 132 is contained within the valve chamber 130 and is adapted to seat on a valve seat 133 formed on the piston and which is operated to control communication between the valve chamber 130 and the chamber 127 through connecting passages 134 in the piston stem 126. The release valve is provided with a stem 135 the small end of which slides within a bore in the stem of the piston 125, and the larger end of which is provided with a collar 136 which slidably engages the piston within a central bore 137 and is subject to the pressure of the release valve spring 138 interposed between the engaging collar 136 and the annular flange 139 on the piston. Outward movement of the release valve relative to the piston 125 is limited by the collar 136 which engages a stop plate 140 that is secured to the piston 125.

A mechanism is provided for controlling the operation of the supply valve 114 and the release valve 132 comprising spaced levers 141 that are pivotally mounted intermediate their ends on a pin 142 supported in a plunger 143 that is slidably guided within a bore 144 in the casing of the valve portion 106.

The upper ends of the spaced levers 141 are connected together by a pin 145 which is loosely mounted within a roller 146 that is adapted to operatively engage the outer end of the release valve stem 135. The lower ends of the spaced levers 141 are connected together by a pin 147 on which one end of the operating rod 148 is pivotally mounted, the opposite end of the rod operatively engaging the supply valve 114 within a recess 149 formed in its face.

For the purpose of operating the plunger 143 toward the right there is provided an operating lever 151 which is loosely mounted on the shaft 101 that is supported in the main body portion 105 of the casing. Secured to the shaft 101 is an intermediate lever 152 provided with a lug 153 which overrides the lever 151 so that when the shaft 101 is rotated in a clockwise direction the lug 153 engages the lever 151 to cause it to move the floating pivot carrier or plunger 143 toward the right. A stop 154 is provided to limit the backward movement of the lever 151.

When the shaft 101, and the lever 151, are in their release positions, as shown in Fig. 5, the spring 117 forces the supply valve 114 to its seated position and the spring 138 forces the release valve 132 toward the left to its unseated position. It will be appreciated that the force of the release valve spring 138 is less than the force of the supply valve spring 117 which is less than the force of the regulating spring 129.

The emergency portion 108 of the brake valve device 9 is provided with a block 155 secured to a rod 156. One end of the rod 156 is connected to a piston 157 positioned within the piston chamber 158. For normally maintaining the rod 156 and the block 155 in its illustrated position, a piston 159 is provided within a piston chamber 161 the piston chamber being connected to the safety control passage and pipe 16. So long as the pressure within the piston chamber 161, and within the safety control pipe 16, is maintained at its normal value the piston 159 is urged against the piston 157 with sufficient force to maintain the rod 156 and the block 155 in their illustrated position against the pressure of the spring 162.

The relay valve devices 7 and 8 are alike in construction, the relay valve device 7 controlling the flow of fluid under pressure from the main reservoir pipe 54 to the brake cylinders 1 and 2 through the brake cylinder pipe 163, and the relay valve device 8 controlling the flow of fluid under pressure from the main reservoir pipe 54 to the brake cylinders 3 and 4 through brake cylinder pipe 164. The relay valve device 7 comprises a casing having a piston chamber 165, that is connected to the application and release pipe 11, and which contains a piston 166 that is adapted, through the medium of a stem 167, to operate a slide valve 168 that is operatively connected to the stem and contained in a valve chamber 169 that is constantly connected to the brake cylinders 1 and 2 through a brake cylinder pipe 163. Also contained in the casing is a fluid pressure supply valve 171, which is subject to the pressure of the spring 172, and which is provided with a stem 173 that is adapted to be operatively engaged by the end of the piston stem 167.

The relay valve device 7 is shown with the relay piston 166 and the slide valve 168 in their extreme right or brake releasing positions. With the slide valve 168 in this position the valve chamber 169 and consequently the brake cylinders 1 and 2 are connected to the atmosphere through an exhaust passage 174. With the piston 166 in release position the stem 167 will be out of engagement with the end of the supply valve stem 173 so that the pressure of the spring 172 will maintain the supply valve 171 seated against its seat rib 175, thereby maintaining communication closed from a chamber 176, that is constantly connected to the main reservoir 6 through a main reservoir pipe 54, to the valve chamber 169.

The relay valve devices 7 and 8 are controlled in part by the magnet valve portion 12, comprising an application magnet valve device 18 and a release magnet valve device 19 that are controlled by the retardation controller 17, a check valve device 177, and a pressure retaining valve 178. The magnet valve portion 12 controls the flow of fluid under pressure from the brake valve device 9 through pipe 13 to the application and release pipe 11 and to the piston chamber of the relay valve devices 7 and 8, and from the application and release pipe 11 to the atmosphere through the pressure retaining valve 178 in a manner to be later explained. The magnet valve portion 12 corresponds structurally to the magnet valve portion 23, comprising an application magnet valve device 21, a release magnet valve device 22, an inshot valve device 179, and a pressure retaining valve device 181.

The magnet valve portion 23 controls the flow of fluid under pressure from the pipe 51, communicating with the manually operable brake controller device 14, through the double check valve device 182, the pipes 183 and 184 to the pressure cylinder of the dynamic brake controller 24. The application magnet valve device 21 comprises a casing enclosing a chamber 185, that is in constant communication with the pipe and passage 183, and an application valve chamber 186, that is in constant communication through passage and pipe 184 with the piston chamber of the dynamic brake controller 24, and which contains an application valve 187 that is connected by a stem 188 to an operating magnet 189. A spring 191 is provided in the chamber 185 for urging the valve 187 to its seat.

The release magnet valve device 22 is provided with a casing enclosing a release valve chamber 192 containing a release valve 193, for controlling communication between the valve chamber 192 and a chamber 194, that is provided with a valve stem 195 that is operatively connected to be actuated by a magnet 196. A spring 197 is provided in the release valve chamber 192 for urging the release valve 193 to its seat. The chamber 194 is in communication with the atmosphere through a pressure retaining valve device 181 that is effective to prevent the release of fluid under pressure from the chamber 194 to the atmosphere when the pressure in the chamber 194 reaches a predetermined low value for which the valve device 181 is set.

The check valve device 179 comprises a casing structure which defines a valve chamber 199 that encloses a ball valve 201 supported on a stem 202 that is carried by a piston 203 in a cylinder below the valve chamber 199. The piston 203 is biased upwardly by a spring 204 to maintain the ball valve 201 in its unseated position. The lower side of the piston 203 is in communication with the atmosphere through an outlet port 205.

The retardation controller 17 comprises a casing enclosing an inertia device or pendulum 206 that is pivotally supported on the pin 207 and positioned adjacent a spring pressed plunger 208 that resists the movement of the pendulum 206 forwardly from its vertical position, and upon the lower end of which is mounted a movable contact member 209 for engaging the fixed contact members 211 and 212 to control the magnet valve devices 18 and 19, and 21 and 22. The plunger 208 extends through a cylindrical bore formed by the inner wall 213 of a guide member that is also provided with an outer cylindrical wall 214 that engages an outwardly extending cylindrical guide wall 215 of the casing member. A spring 216 is provided between the walls 213 and 214 of the guide member for urging the guide member inwardly, and a spring 217 is provided within a bore in the plunger member 208 for urging the plunger 208 inwardly toward the pendulum 206 to a position such that the flange 218 on the outer end of the plunger member engages the end of the cylindrical wall 213 of the guide member. The outer ends of the springs 216 and 217 engage a cap member 219 that is provided with an inwardly extending cylindrical guide flange 220 for engaging the inner surface of an outwardly extending cylindrical wall 221 extending from the retardation controller casing. A spring 222 is provided surrounding the cylindrical wall 215, the inner end of which is in engagement with the casing wall of the retardation controller and the outer end of which engages the cap member 219 to urge it outwardly. The lower end of the lever 82, that is actuated in accordance with movement of the handle 42 of the manual controller 14, engages the outer face of the cap member 219 and is adapted to move the cap member inwardly to adjust the setting of the retardation controller in a manner to be later explained.

Upon movement of the pendulum 206 toward the left against the force of the plunger 208 sufficiently to permit engagement of the contact members 209 and 211, a circuit is completed causing the energization of the windings of the application magnet valve devices 18 and 21. Upon the application of a sufficiently greater force, the pendulum 206 will move the plunger 208 further toward the left until the contact member 209 engages the contact member 212 to effect the closing of a circuit for causing energization of the windings of the release magnet valve devices 19 and 22. The position of the cap 219 determines the particular force of the pendulum required against the plunger 208 to effect engagement of the contact member 209 with the contact members 211 and 212.

In order to provide for changing the setting of the retardation controller upon a reduction in pressure in the safety control pipe 16, a lever 223 mounted on the pivot pin 224 is provided having its upper end in engagement with the outer face of the cap 219 and pivotally connected by the pin 225 at a point intermediate its ends to a stem 226 that is in engagement with a diaphragm 227 that forms one wall of a pressure chamber 228. The diaphragm 227 is subject on one side to the force of a spring 229 and on the other side to the pressure within the chamber 228 which corresponds to the pressure within the safety control pipe 16. When the pressure within the safety control pipe 16, and within the chamber 228, is insufficient to overcome the pressure of the spring 229 this spring becomes effective to force the lever 223 toward the right against the bias of the springs 217, 216 and 222 thus increasing the force required by the pendulum 206 against the spring 217 to effect engagement of the contact member 209 with the contact members 211 and 212.

The pressure operated dynamic braking controller 24 comprises a casing enclosing a piston chamber 231 containing a piston 232 having a stem 233 that is operatively connected to a rack 234 having gear teeth for engaging a pinion 235 that is connected to a shaft 236 for operating the controller drum 237. Fluid under pressure for operating the controller is supplied to the piston chamber 231 in accordance with the operation of the magnet valve devices 21 and 22 and of the controller device 14 or of the deadman valve 15, through a restricted passage 238 and a pipe 184 that is connected to the piston chamber 231 and to a volume reservoir 239.

The controller drum 237 is provided with conducting segments 241, 242, 243 and 244. The conducting segment 244 controls the interruption of power to the vehicle driving motors 31, 32, 33 and 34 upon movement of the controller to a brake applying position and also controls the application of the dynamic brake. The conducting segment 243 controls the lowering and raising of the magnetic track shoes into and out of engagement with the track rail. The conducting segment 242 controls the supply of current to the magnetic track shoe winding, and the conducting segment 241 controls the degree of energization of the winding of the track shoe brake in a manner to be later explained. A cam 245 is provided on the lower end of the shaft 236 for engaging the upper end of a lever 246 that is pivotally mounted on the pin 247, and the lower end of which is attached to the cable 97 for effecting the operation of the brake valve device 9 in accordance with the operation of the controller 24.

Mechanism is provided for operating the magnetic track shoes 25 and 26 into and out of engagement with the track rail 248 and comprises a track shoe magnet valve device 249 and raising cylinders 251 and 252. Similar mechanism is provided for raising and lowering the magnetic track shoes 27 and 28.

The magnetic track shoe cylinders 251 and 252 are each provided with pressure chambers 253 one side of which consists of a movable piston or diaphragm 254, that is connected by a stem 255 to one end of a bell crank lever 256 that is pivotally supported by the pin 257 on a portion of the car body 258, and the other end of which is pivotally connected by a pin 259 to support the brake shoes 25 and 26. A spring 261 is provided within each track shoe raising cylinder which, together with the weight of the track shoes, exerts a force on the diaphragms 254 in opposition to that exerted by the pressure within the chambers 253, to force the track shoes downwardly against the rail. The chambers 253 are supplied with fluid under pressure from the main reservoir pipe 54 through pipe 262 as controlled by the track shoe magnet valve devices 249.

The magnet valve device 249 comprises a casing providing a valve chamber 263 containing a release valve 264 and an application valve 265, the valve 264 having a valve stem extending upwardly to be actuated by the magnet 266. The release valve 264 controls communication from the chambers 254 of the track shoe raising cylinders to the atmosphere through exhaust passage 267, and the application valve 265 controls communication between the chamber 263 and the main reservoir pipe 54 through chamber 268. A spring 269 is provided in the lower portion of the casing for urging the valves 264 and 265 upwardly to effect the seating of the release valve 264 and the unseating of the application valve 265. The apparatus for raising and lowering the track shoes 27 and 28 is a duplicate of that employed to raise and lower the track shoes 25 and 26, and is therefore not described in detail.

The magnets 266 of the track shoe raising and lowering magnet valve devices 249 are energized from a source of energy, such as the battery 271, to effect the lowering of the magnet track shoes into engagement with the rail, either upon engagement of the conducting segment 243 of the controller 24 with the contact members 272 and 273, or upon operation of an automatic safety control switch 274 to its circuit closing position upon a reduction in safety control pipe pressure below a predetermined value. A track brake line switch 275 is provided for completing an energizing circuit for the magnet track shoes from the overhead line conductor 276 to ground when the controller 24 is in position to close a circuit through its conducting segment 241. A safety control automatic pressure switch 277 is also provided for automatically completing a circuit from the overhead conductor 276 to ground through the magnet track shoes upon a predetermined reduction in safety control pipe pressure independently of the operation of the controller 24.

The pressure controlled automatic switch devices 274 and 277 are alike in construction and each comprises a casing having a piston chamber 278 that is in communication with the safety control pipe 16, and that contains a piston 279 that is provided with a stem 281 for carrying a movable contact member 282. A spring 283 is provided above the piston 279 for urging it downwardly. So long as the pressure in the piston chamber 278 is greater than the downward pressure of the spring 283 the contact member 282 remains in a circuit interrupting position while, upon a decrease in pressure in the piston chamber 278 and in the safety control pipe 16 below a predetermined amount, the spring 283 will move the piston 279 and the contact member 282 downwardly to a circuit closing position.

A line circuit breaker 283 and a power controller, represented by the contact members 284 and 285 and controlled by a controller handle device 286, are provided for controlling the supply of power to the motors 31, 32, 33 and 34 from the overhead line conductor 276. A dynamic brake contactor 287 is also provided for controlling the flow of current from the motors through the dynamic brake resistor 35 for effecting application of the dynamic brake.

The braking equipment also includes apparatus for effecting deadman operation, which comprises the deadman valve 15, the controller handle device 286, and a diaphragm foot valve device 287, for effecting an emergency application of the brakes upon a reduction of pressure in the safety control pipe 16 below a predetermined value. A cut-off valve device 288 is provided for preventing operation of the deadman feature provided the brakes have been applied sufficiently to provide a predetermined brake cylinder pressure. A conductor's valve 289 is also provided for venting the safety control pipe 16 to effect an emergency application of the brakes. A reduction in pressure in the safety control pipe 16, from any cause, effects an emergency application of the pneumatic brake and also of the dynamic brake through operation of the deadman valve device 15 and the pressure operted controller 24, and an emergency application of the magnet track shoe brake device through operation of the automatic pressure switches 274 and 277 in a manner to be later explained.

The controller handle device 286 may comprise a handle 291 fastened on the pin 292 in the controller handle tread and provided with outwardly extending bifurcated fingers 293 that engage beneath the head of a pin 294 to move the pin upwardly as the handle 291 is pressed down, thus raising the pin 294 against the pressure of a spring 295 to bring it out of engagement with the lever 296. The lever 296 is pivotally mounted on a pin 297 in the casing of the controller handle device, and its shorter end engages a valve stem 298 that extends upwardly to a double beat valve 299 that is pressed downwardly by a spring 301 in the valve chamber 302. When the pin 294 is raised from engagement with the lever 296 the spring 295 forces the pilot valve 299 to its lower seated position to close communication between an exhaust port 303 and the valve chamber 302 that is in open communication, through the pipe 304, with the chamber 305 of the foot pedal device 287, and effects communication between the valve chamber 302 and a chamber 306 that is constantly connected to the main reservoir pipe 54.

The foot valve device 287 comprises a casing provided with the aforementioned chamber 305 and with a valve 307 that is adapted to engage the seat rib 308 to control communication between the chamber 305 and a chamber 309, that is in open communication with a pipe 311 that is connected to the cut-off valve device 288. When pressure is maintained on the foot pedal 312 the valve 307 is held in its seated position closing communication between the pipes 304 and 311. When the pressure on the foot pedal 312 is released the spring 313 forces the foot pedal upwardly, unseating the valve 307.

The cut-off valve device 288 is provided with a valve 314 for controlling the flow of fluid under pressure from a supply valve chamber 315, that is in open communication with the safety control pipe 16, to a chamber 316, that is in open communication with the pipe 311. The chamber 316 is in open communication with the chamber 309 of the foot valve device through pipe 311.

The cut-off valve device is also provided with a diaphragm 317 that is adapted to force the valve 314 to its seat when the pressure in the chamber 318, above the diaphragm 317, exceeds that acting upon the underside of the valve 314. The pressure above the diaphragm 317 is controlled by a control valve 319 which is urged toward a lower seat 321 by a spring 322 and toward an upper seat 323 by the pressure below the valve.

When the control valve 319 is positioned against its lower seat, the chamber 318, above the diaphragm 317, is in communication with the atmosphere through a passage 324, past the open upper seat 323 of the valve 319. A chamber 325, below the valve 319, is in constant communication with the brake cylinder pipe 163.

When the pressure within the chamber 325, which corresponds to the brake cylinder pressure, reaches a predetermined amount the control valve 319 is forced upwardly from its lower seat 321 against its upper seat 323 cutting off communication between the chamber 325 and the atmosphere, and effecting the supply of fluid under pressure at brake cylinder pressure to the chamber 318. When the fluid pressure above the diaphragm 317 reaches a predetermined value the valve 314 will be seated thus closing communication between the chambers 315 and 316, thus preventing the flow of fluid under pressure from the safety control pipe 16 to the chamber 305 in the foot valve device.

The conductor's valve device 289 may comprise a casing containing a chamber 326 that is in constant communication with the safety control pipe 16. A valve 327 is contained within the chamber 326 for controlling communication between the chamber 326 and a chamber 328, that is in communication with the atmosphere through the exhaust port 329. The valve 327 is normally biased upwardly to its seated position by a spring 231, thus closing communication between the safety control pipe 16 and the atmosphere. A valve stem 332 extends upwardly from the valve 327 and engages a valve lever 333 pivoted on a pin 334 mounted on the valve casing. An operating lever 335 is pivotally mounted upon a pin 336 carried on a bracket extending upwardly from the valve casing and which when moved in either direction forces the valve lever 333 downwardly unseating the valve 327 and permitting fluid under pressure to be vented from the safety control pipe 16 to the atmosphere through the exhaust port 329.

The deadman valve device 15 comprises a casing providing a valve chamber 326, that is in communication, through pipe 327 and the double check valve 182, with the pipe 183, and which contains a valve 328 that is adapted to engage the seat rib 329 to close communication between the valve chamber 326 and an exhaust chamber 331, that is in open communication with the atmosphere through exhaust passage 332. The valve 328 is provided with a downwardly extending stem 333 that extends through a bore in the wall separating the chambers 326 and 331. The valve 328 is provided with a downwardly extending stem 333 that extends through a bore in the wall separating the chambers 326 and 331. A spring 334 is provided within the chamber 326 for forcing the valve 328 downwardly against its rib seat 333. The valve 328 is provided with a bore containing a needle valve 335 in its upper end for closing communication between the valve chamber 326 and an inlet passage or chamber 336 in the upper part of the relay valve casing that is in open communication with the main reservoir pipe 54.

The deadman valve device 15 is also provided in its lower end with a piston chamber 337 containing a piston 338 provided with an upwardly extending stem 339 for engaging the lower end of the valve stem 333. The piston chamber 337 is in open communication with the safety control pipe 16. When the pressure within the safety control pipe 16 and the piston chamber 337 is above a predetermined value the piston 338 and the valves 328 and 335 are forced upwardly to their illustrated positions, thus closing communication between the main reservoir pipe 54 and the pipe 327 leading to the foot valve device 287, and effecting communication between the pipe 327 and the atmosphere through exhaust passage 332.

The operation of the braking system will now be described. The various parts of the apparatus are illustrated in their brake release position, and, in this position, the equipment is charged by the flow of fluid under pressure from the main reservoir 6 past the feed valve device 3 to the main reservoir pipe 54 at a reduced pressure. From the main reservoir pipe 54 fluid under pressure flows to the application valve chamber 112 of the brake valve device 9 and to the control valve chambers 176 of the relay valve devices 7 and 8. Fluid under pressure also flows from the main reservoir pipe 54 to the chamber 336 of the deadman valve device 15 and to the valve chambers 268 of the track shoe raising and lowering magnet valve devices 249, to the pilot valve chamber 306 in the controller handle device 286, and to the valve chamber 50 in the manually operable brake valve device 14. From the valve chamber 50 fluid under pressure flows through the choke 57 and passage 56 to charge the safety control pipe 16.

From the safety control pipe 16 fluid under pressure flows to the piston chamber 337 of the deadman relay valve device 15 to force the piston 338 and the valves 328 and 335 to their upper or illustrated positions. Fluid under pressure also flows from the safety control pipe 16 to the chamber 315 of the cut-off valve device 288, and to the piston chamber 278 of the pressure operated switch devices 277 and 274, to the piston chamber 161 in the emergency portion of the brake valve device 9, to the pressure chamber 228 in the retardation controller device 17, and to the valve chamber 326 of the conductor's valve device 289. The pressure operated switch devices 277 and 274 are thus held in their illustrated, or circuit interrupting, positions, the pressure within the chambers 278 being greater than the downward pressure of the springs 283. Likewise the piston 159 in the emergency portion of the brake valve device 9, the rod 156, and block 155, are held in their illustrated positions against the pressure of the spring 162. The pressure in the chamber 228 of the retardation controller device urges the diaphragm 227, the stem 226, and the lever 223 toward the left against the force of the spring 229, thus relieving the pressure of the upper end of the lever 223 against the cap 220, and permitting the setting of the retardation controller to be controlled solely by the position of the lever 82 in accordance with the position of the handle 42 of the brake controlling device 14.

Pressure must now be maintained either on the foot valve device lever 312, or on the handle 291 of the controller handle device 286, to prevent fluid under pressure from flowing from the safety control pipe 16 to the atmosphere, through the cut-off valve device 288, the pipe 311, the foot valve device 287, the pipe 304, the pilot valve portion of the controller handle device 286, and the exhaust passage 303, to effect an emergency operation of the brakes.

When the dynamic brake controller 24 is in its release position, a circuit is completed from the positive terminal of the battery 271 through conductor 341, contact member 342, conducting segment 244, and contact member 343 of the controller 24, conductor 344, the winding of the line switch 283, conductors 345 and 346 to the negative terminal of the battery 271. The energization of this circuit causes the line switch 283 to be operated to its circuit closing position, thus connecting the motor controller to the overhead line conductor 276 by a circuit through trolley 347, conductor 348, the contact members of the line switch 283 and conductor 349, to conductor 285 of the controller. Upon movement of the controller handle device 286 to effect operation of the motors, the motor circuit is completed through the contact member 284, with the contact member 285, conductor 351, to the junction point 352, and from this junction point through two branch circuits, one such circuit extending through the armatures 353 and 354 of the motors 31 and 32, respectively, and the field windings 355 and 356 of the motors 33 and 34, respectively, to the grounded terminal 357. The other branch circuit extends from the junction point 352 through the field windings 358 and 359 of the motors 31 and 32, respectively, and the armature windings 361 and 362 of the motors 33 and 34, respectively, to the grounded terminal 357.

If the operator wishes to apply the brakes, the handle 42 of the brake controlling device 14 is moved from its release position. Upon the initial movement of the handle from its release position the sloping surface 363 of the cam 39 (see Fig. 6) moves outwardly against the rod 84, thus causing a clockwise rotation of the levers 86 and 93 to effect movement of the lever 99 on the brake valve device 9 to effect a pneumatic operation of the brakes. The valve 49 on the lower end of shaft 38 is simultaneously moved by the handle 42 from its release position, thus cutting off communication between the dynamic brake controller pipe 51 and the atmosphere, and effecting communication between the pipe 51 and the main reservoir pipe 54, as will appear by reference to the lower portion of the diagram in Fig. 6, thus permitting the flow of fluid under pressure from the main reservoir pipe 54, through pipe 51, past the valve 365 of the double check valve device 182 in its illustrated position to pipe 183, through the magnet valve portion 23 and pipe 184 to the piston chamber 231 of the dynamic brake controller 24, thus causing movement of the piston 232 together with its stem 233 toward the left, causing the rack 234 to operate the pinion 235 and the controller drum 237 to effect an application of the magnetic track shoe brake and of the dynamic brake in a manner to be presently described. The rate of flow of fluid under pressure to the piston chamber 231 is limited by the restricted passage 238 and also by the volume reservoir 239 connected to the pipe 184 to ensure a gradual movement of the piston 231, and of the controller drum 237.

The movement of the lever 99 of the brake valve device 9, the shaft 101 and the operating lever 151 in a clockwise direction forces the plunger 143 toward the right. The first part of this movement effects a compression of the release valve spring 138 and forces the release valve 132 to its seat closing communication between the pressure chamber 109 and the atmosphere through the passages 131, 134 and 128. Further movement of the plunger 143 toward the right causes the spaced levers 141 to pivot about their upper ends, further movement of the roller 106 being prevented by the stiffness of the regulating spring 129, and causing the rod 148 to force the supply valve 114 against the compression of the supply valve spring 117 to open communication between the main reservoir pipe 54 and the pressure chamber 109, through passage 54 and the supply valve chamber 112, thus supplying fluid under pressure from the main reservoir 6 through passage and pipe 13, the magnet valve portion 12 and the application and release pipe 11 to the piston chamber 165 of the relay valve devices 7 and 8.

The amount of fluid under pressure supplied to the pressure chamber 109 of the brake valve device 9, and to the piston chambers 165 of the relay valve devices 7 and 8, is dependent upon the degree of movement of the operating lever 151 and of the plunger 143 from their release positions since, while the pressure within the chamber 109 decreases due to the flow of fluid thereto through the supply valve chamber 112, a pressure is exerted on the chamber side of the piston 125 in opposition to the pressure exerted by the regulating spring 129. This pressure continues to build up until it becomes sufficient to force the piston 125 toward the right, relieving the pressure on the roller 146 and permitting the supply valve spring 117 to force the rod 148 toward the left, pivoting the levers 141 about the pivot pin 142 and moving the supply valve 114 into engagement with its seat 116. The amount of pressure on the chamber side of the piston 125 necessary to effect sufficient movement of the piston 125 to cause the supply valve 114 to seat is dependent upon the amount of movement of the operating lever 151 and of the plunger 143 from their release positions. The greater the movement of the operating lever 151 from its release position the greater will be the movement of the pivot pin 142 toward the right, and, consequently, the greater will be the compression of the regulating spring 129 necessary to permit movement of the lever 141 and of the rod 148 to effect the seating of the supply valve 114. It will be apparent, therefore, that the brake valve device is self-lapping on a pressure basis, the degree of fluid pressure within the pressure chamber 199 necessary to effect movement of the valve to lap position being dependent upon the degree of movement of the operating lever 151 from its release position. The degree of movement of the operating lever 151 of the brake valve device 9 from its release position is in turn dependent upon the degree of movement of the cam 39 of the brake controlling device 14 from its release position, or the portion of the sloping surface 363 of the cam 39 that is in engagement with the pin 84. After the handle 42 of the brake controlling device 14 has been moved sufficiently to rotate the cam 39 from the position represented in Fig. 6 by the vertical line 366 to the position represented by the vertical dot and dash line 367, corresponding to the first pneumatic service zone, the pin 84 will have moved away from the shaft 38 along the entire outwardly sloping surface 363 of the cam 39, and further movement of the handle 42 and of the cam 39 will not effect a further movement of the pin 84 or of the bell crank levers 86 and 93, and the cable 97, to effect a further operation of the brake valve device 9 by action of the cam 39. Further movement of the cable 97 to effect operation of the brake valve device 9 to cause a further increase in brake cylinder pressure may however be occasioned by operation of dynamic brake controller 24 in a manner to be later explained.

Fluid under pressure thus supplied to the piston chamber 165 of the relay valve devices 7 and 8 causes the relay piston 166 to move toward the left carrying the slide valve 168 with it. (The operation of the relay valve devices will be described with respect to the relay valve device 7 it being understood that the relay valve device 8 operates in exactly the same manner.) As the relay piston and slide valve are thus moved, the slide valve laps the release port 174 closing communication from the relay slide valve chamber 169 to the atmosphere. After the port 174 is lapped the end of the piston stem 167 engages the stem 173 of the supply valve 171 and causes this valve to be unseated from its rib seat 175 against the pressure of the spring 172. With the supply valve 171 unseated fluid under pressure is supplied from the main reservoir 6 through the feed valve device 5, at a reduced pressure, through the main reservoir pipe 54, valve chamber 176, past the unseated valve 171, through slide valve chamber 169 and the brake cylinder pipe 163 to the brake cylinders 1 and 2. Fluid under pressure controlled by the relay valve device 8 flows from the main reservoir pipe 54 through the brake cylinder pipe 164 to the brake cylinders 3 and 4.

With the relay and valve in this position a force is exerted to move the piston 166 and the valve 168 away from the supply valve 171 that consists of the pressure within the slide valve chamber 169 plus the pressure of the spring 172. The pressure within the slide valve chamber 169 is not immediately effective against the rear of the piston 166 because of the provision of a phantom piston 371 between which and the piston 166 a chamber 372 is provided connected to the slide valve chamber 169 through a restricted opening 373. Upon an increase or decrease in the pressure within the slide valve chamber 169 the flow of fluid under pressure through the opening 373 between the chambers 372 and 165 causes the pressure within the chamber 372 to become equal to that within the valve chamber 169 after a slight time interval. When the pressure in the chamber 372 builds up to substantially the pressure on the face of the piston 166 as supplied through the application and release pipe 11 the piston is moved away from the supply valve 171 sufficiently to permit it to seat and cut off communication between the main reservoir pipe 54 and the brake cylinders 1 and 2. When the supply valve 171 is seated, the spring 172 is no longer effective to force the valve stem 173 against the piston stem 167 so that the piston 166 and the slide valve 168 do not move further or sufficiently to unlap the release port 174. Fluid under pressure is therefore retained in the valve chamber 169 and in the brake cylinders 1 and 2 that is substantially equal to the pressure in the application and release pipe 11.

If the handle 42 of the brake controlling device 14 has been moved to a brake applying position while the controller handle device 286 remains in a position to supply power to the motors through contact members 284 and 285, the motor circuit will be interrupted upon the initial movement of the controller 24 from its release position, by separation of the conducting segment 244 from the contact member 343, thus interrupting the above traced circuit through the winding of the line switch 283 thus permitting the line switch to drop to its circuit interrupting position.

The magnetic track brake is applied upon movement of the controller drum 237 to cause engagement of the conducting segment 241 with the contact members 374 and 375, the engagement of the conducting segment 242 with the contact members 381 and 382, and the engagement of the conducting segment 243 with the contact members 272 and 273. Engagement of the conducting segment 243 with the contact members 272 and 273 closes a circuit from the positive terminal of the battery 271, through conductor 341, contact member 273, conducting segment 243, contact member 272, conductor 386 to the winding of the magnets 266 of the track shoe raising and lowering magnet valve devices 249, and conductors 387 and 346 to the negative terminal of the battery 271, thus energizing the magnets 266 to force the valves 264 and 265 downwardly against the bias of the springs 269 to close communication from the main reservoir pipe 54 through pipe 262 to the pressure chamber 253 of the magnet track brake cylinders 251 and 252, and effecting communication from the chamber 253 to the atmosphere through valve chamber 263 past the unseated release valve 264 and to the atmosphere, through exhaust port 267, thus releasing fluid under pressure from the pressure chamber side of the diaphragms 254 and permitting the springs 261 and the weight of the track shoes to force the track shoes downwardly into engagement with the track rail 248.

Upon engagement of the conducting segment 242 with the contact members 381 and 382 a circuit is completed for operating the track brake line switch 275 to a circuit closing position and in which position it will be retained so long as the motors 31, 32, 33 and 34 are revolving at a speed sufficient to produce a counter-electromotive force sufficient to supply the necessary energizing current to the line switch 275. This circuit extends from the grounded motor terminal 357 through the grounded contact member 382, conducting segment 242, contact member 381, conductor 388, the winding of the track brake line switch 275 and conductor 389 to the junction point 391 on the motor circuit.

The completion of the above traced circuit causes the track brake line switch 275 to be operated to its circuit closing position thus connecting the overhead conductor 276 through trolley 347, conductor 348, the contact members of the line switch 275 and conductor 392, to the contact member 374 on the controller 24. Since the conducting segment 241 is now in a position to bridge the contact members 374 and 375, a circuit is completed through the several sections of the resistor 393 and conductor 394, through the several windings of the track shoes 25, 26, 27 and 28 to the grounded terminal 395, thus energizing the track shoe brakes to effect an application thereof to retard the speed of the vehicle. As the controller drum 273 and the conducting segment 241 move further from their release position, the conducting segment 241 engages successively contact members 376, 377, 378 and 379, thus shunting from the energizing circuit of the track shoe magnet the first four sections of the resistor 393 and effecting a step by step increase in the energization of the magnets with a consequent increase in degree of application of the track shoe brakes.

Upon movement of the controller drum 237, of the controller 24, sufficiently to cause engagement of the conducting segment 244 with the contact member 383 a circuit is completed for closing the dynamic braking contactor 287, that extends from the positive terminal of the battery 271 through conductor 341, contact member 342, the conducting segment 244, contact member 383, conductor 396, the winding of the dynamic brake contactor 287 and conductors 345 and 346 to the negative terminal of the battery 271. The above traced circuit, when energized, causes the dynamic braking contactor 287 to be operated to its circuit closing position, thus completing a circuit from the junction 391 of the motor circuit through conductors 389 and 397, the contact members of the contactor 287, conductor 398 to the movable contact point 399 on the rheostat comprising the dynamic braking resistor 35, through conductor 401 to the junction point 402 on the motor circuit.

Upon engagement of the conducting segment 244 with the contact member 384 a circuit is completed through a winding 403 of a motor operated current regulating device 404, which may be any suitable well known current regulator, and is indicated in the drawings, as a rectangle, through conductors 405, 345 and 346 to the negative terminal of the battery 271, thus energizing the winding 403 of the current regulating device 404 to effect such operation of the rheostat contact arm 399 as to maintain a certain predetermined constant current flow through the dynamic braking resistor 35, while the motors 31, 32, 33 and 34 are slowing down. Upon a further movement of the conducting segment 244 from its release position to engage the contact member 385 a circuit is completed through a winding 406 of the current regulator 404 to effect an operation thereof to cause such movement of the rheostat contact arm 399 as to effect a greater constant current flow through the dynamic braking resistor 35, and consequently a greater predetermined dynamic braking action on the motors 31, 32, 33 and 34.

As the piston 232 and the controller drum 237 are moved from their release positions to cause an increasing degree of application of the track shoe brake, and of the dynamic brake, the cam 245 on the lower part of the shaft 236 effects a movement of the lever 246 about the pivot pin 247 to cause the lower end thereof, that is connected to the cable 97, to be moved toward the left. This movement of the cable 97 toward the left causes movement of the lever 99, the shaft 101 and the control lever 151 of the brake valve device 9 in a clockwise direction to increase the degree of application of the pneumatic brake by operation of the brake valve device 9 as above described.

It will be noted that, after the brake controller device 14 has been so operated as to effect the supply of fluid under pressure to the piston chamber 231 of the pressure operated controller 24, the controller will operate to gradually rotate the drum 237 and effect an increasing degree of application of the track shoe braking means, an increasing degree of application of the dynamic braking means, and an increasing degree of application of the fluid pressure braking means, unless the supply of fluid under pressure to the piston chamber 231 is interrupted. As the degree of application of the several braking means increases, the rate of retardation of the vehicle correspondingly increases, thus causing the pendulum 206 of the retardation controller 17 to be moved by inertia, from its vertical position toward the left, against the spring pressed plunger 208, an amount depending upon the rate of retardation of the vehicle.

Upon a minimum predetermined rate of retardation of the vehicle, the contact member 209 engages the contact member 211 to cause operation of the application magnet valve devices 21 and 18, respectively, of the magnet valve portions 23 and 12, the application magnet valve 21 being effective to cut off the supply of fluid under pressure to the piston chamber 231 of the pressure operated controller 24, and the application magnet valve device 18 of the magnet valve portion 12 being effective to cut off communication of fluid under pressure to the piston chambers 165 of the relay valve devices 7 and 8, thus preventing a further increase in the degree of application of the track shoe brakes, the dynamic brakes, and the fluid pressure brakes. This circuit extends from the positive terminal of the battery 271, through conductor 407, branch conductor 408, contact members 209 and 211 of the retardation controller, branch conductor 409 to the junction point 411, and from the junction point, by conductor 412, through the winding of the application magnet valve device 21, by conductor 413 to the negative terminal of the battery 271, and from the junction point 411, through conductor 414, the winding of the application magnet valve device 18, conductors 115, 387 and 346 to the negative terminal of the battery 271.

Upon a predetermined further increase in the rate of retardation of the vehicle the pendulum 206 will be moved sufficiently further from its vertical position to cause the contact member 209 to engage the contact member 212, to close a circuit for energizing the windings of the release magnet valve devices 22 and 19, respectively, of the magnet valve device portions 23 and 12, to effect the release of fluid under pressure from the piston chamber 231 of the pressure operated controller 24, and from the piston chambers 165 of the relay valve devices 7 and 8, to correspondingly reduce the degree of application of the track shoe brakes, the dynamic brakes, and the fluid pressure brakes. This circuit extends from the positive terminal of the battery 271, through conductor 407, branch conductor 408, contact members 209 and 212 on the retardation controller, branch conductor 416 to the junction point 417, and from this point through two branch circuits, one of which extends through conductor 418, the winding of the magnet valve device 22, and conductor 413 to the negative terminal of the battery 271. The other branch circuit extends from the junction point 417, through conductor 419, the winding of the release magnet valve device 19 and conductor 115 to the negative terminal of the battery 271. Upon energization of the windings of the release magnet valve devices 22 and 19 the release valves 193 are forced downwardly against the pressure of the springs 197 to permit the release of fluid under pressure to a predetermined low value as determined by the setting of the pressure limiting valves 181 and 178, respectively.

The magnet valve portions 23 and 12 are respectively provided with check valve devices 179 and 177 for permitting the flow of fluid past the magnet valve portion independently of the operation of the application magnet valve devices 21 and 18, respectively. Referring to the check valve device 179, should, for any reason, the application magnet valve device 21 become energized, or otherwise held in its seated position, thus preventing the flow of fluid under pressure from the passage 183 to the passage 184 through chambers 185 and 186, which might prevent the application of the brakes, a minimum degree of application of the brakes is insured by the flow of fluid under pressure from the passage 183 through the ball valve chamber 199 of the check valve device, past the unseated ball valve 201, to the passage 184, until the pressure on the upper side of the piston 203 has reached a predetermined value sufficiently to force the piston downwardly against the bias of the spring 204 to permit the ball valve 201 to seat. A further increase in pressure in the passage 184 above the value required to cause the ball valve 201 to seat will be effective only through operation of the magnet valve device 21. The check valve device 177 operates in a similar manner to insure the supply of fluid under pressure from the pipe 13 to the piston chambers 165 of the relay valve devices 7 and 8, through the application and release pipe 11, independently of the operation of the application magnet valve device 13. The check valve devices 177 and 179 thus insure a predetermined minimum application of the fluid pressure brakes, the track shoe brakes, and the dynamic brakes, independently of the operation of the application magnet valve devices 18 and 21.

If the operator desires a rate of retardation of the vehicle greater than that corresponding to the minimum setting of the retardation controller 17 the handle 42 of the brake controller 14 is moved from its release position past the position corresponding to the vertical dot and dash line 367 in Fig. 6, or until the outwardly sloping face 364 of the cam 41 forces the pin 76 outwardly to cause a counter-clockwise movement of the lever 77, and, through operation of the cable 41, a corresponding counter-clockwise movement of the lever 82 of the retardation controller, the lower end of the lever 82 being forced inwardly against the cap 220, thus compressing the springs 217, 216 and 222, the degree of movement of the cap 220 determining the degree of compression of the spring 217, and consequently, the force of the pendulum 206 against the plunger 208 that is required to cause engagement of the contact member 209 with the contact members 211 and 212 to control the rate of retardation of the vehicle in the manner above described. The greater the movement of the control handle 42 from its release position the greater will be the outward movement of the pin 76, along the face 364 of the cam 41, and, consequently, the greater will be the counter-clockwise movement of the levers 77 and 82 and the compression of the spring 217, and the rate of retardation of the vehicle permitted by the retardation controller device 17.

If the operator now wishes to release the brakes, the brake controller handle 42 is moved to its release position, thus operating the cam 39 and the valve 49 to their release positions. Movement of the valve 49 to its release position closes communication between the main reservoir pipe 54 and the pipe 51, and effects communication between the pipe 51 and the exhaust port 53, thus venting fluid under pressure from the piston chamber 231 of the pressure operated controller 24, through pipe 184, the magnet valve portion 23, pipe 183, the double check valve device 182, pipe 51 and exhaust port 53. The controller 24 is thus operated by the spring 366 to its release position, to release the dynamic brake and the track brake.

Upon operation of the controller 24 to its release position, the pressure of the cam 245 against the upper end of the lever 246 is released, thus permitting the cable 97 to be moved toward the right and the lever 99 to be moved in a counter-clockwise direction by the spring 102 to the extent permitted by the cam 39 on the brake controller 14. In this position of the controller, the energizing circuit for the line switch 283 in the motor circuit is again completed through the contact members 343 and 342 and segment 244 of the controller drum 237, thus operating the line switch to its circuit closing position. Separation between the contact member 383 and the conducting segment 244 interrupts this circuit through the winding of the dynamic braking contactor 287, permitting it to drop to its circuit interrupting position to interrupt the operation of the dynamic braking means. Likewise, separation of the conducting segment 243 from the contact members 272 and 273 interrupts the energization of the track shoe raising and lowering magnet valve devices 249 permitting the valves 264 and 265 to be forced upwardly by the spring 269 and effect communication between the main reservoir pipe 54 and the pressure chamber 253 of the magnet shoe cylinders 251 and 252, to cause the track shoes to be raised from engagement with the track rail 284 in the manner above described.

Also, separation of the conducting segment 242 from the contact members 381 and 382 interrupts the circuit through the winding of the track brake line switch 275, permitting this switch to operate to move to its circuit interrupting position to interrupt the energizing circuit through the magnetic track shoes.

Upon movement of the handle 42 of the brake valve device 14 to its release position the cam 39 is moved, simultaneously with the valve 49, to its release position, thus relieving the pressure on the pin 84 and permitting the spring 102 of the brake valve device 9 to operate the lever 99 and the shaft 101 in a counter-clockwise direction, and thus relieving the pressure on the operating lever 151 against the end of the movable plunger 143 which is forced toward the left by the supply valve spring 117 and the release valve spring 138 on the lower and upper ends, respectively, of the spaced levers 91. Upon movement of the plunger 143 toward the left, the release valve 132 will be moved to its unseated position by the spring 138 to effect communication between the pressure chamber 109 and the atmosphere through passage 131, release valve chamber 130, passage 134, chamber 127 and the exhaust passage 128.

The release of fluid under pressure from the pressure chamber 109 of the brake valve device 9 also effects the release of fluid under pressure from the piston chambers 165 of the relay valve devices 7 and 8, thus decreasing the pressure on the face of the pistons 166, which are moved away from the valve 171 by the pressure in the valve chamber 169 and in the chamber 372, carrying the slide valve 168 with it, until communication is effected between the slide valve chamber 169 and the atmosphere through the exhaust port 174, thus effecting the release of fluid under pressure from the brake cylinders to release the brakes.

If the operator wishes to make an emergency application of the brakes the handle 42 of the brake controlling device 14 is moved an extreme amount from its release position or until the portion of the face of the cam 41, indicated as 416 in Fig. 6, engages the stem 61 of the emergency valve 59, forcing it from its seat against the bias of the spring 62 thus venting air from the safety control pipe 16. The resulting reduction in safety control pipe pressure effects a corresponding reduction in pressure in the piston chamber 337 of the deadman valve 15, piston chambers 278 of the pressure operated switch devices 274 and 277, the piston chamber 161 of the emergency portion of the brake valve device 9 and the pressure chamber 228 of the retardation controller device 17. Upon a predetermined reduction in pressure in the piston chamber 337 of the deadman valve 15 the piston 338, together with the valves 328 and 335, are forced downwardly by the spring 334, the valve 328 seating against its rib seat 329 to close communication from the pipe 327 to the atmosphere through the exhaust passage 332, and the needle valve 335 effecting communication from the main reservoir pipe 54 to the piston chamber 231 of the pressure operated controller 24 through valve chamber 326, pipe 327, the double check valve device 182, pipe 183, the magnet valve portion 23, and pipe 184. The controller 24 is thus operated, as described above, to interrupt the motor circuit and apply the dynamic brake. The track shoe brake is, however, immediately applied to its full extent, independently of the controller 24, upon a reduction in pressure in the safety control pipe 16 below a predetermined value, by the closing of the pressure operated switch devices 277 and 274. The switch device 274 closes a circuit from the positive terminal of the battery 271, through conductors 407 and 421 to energize the winding of the track shoe raising and lowering magnet devices 249 to effect a lowering of the track shoes 25, 26, 27 and 28 into engagement with the track rail 248. The switch device 277, in its circuit closing position, completes a circuit from the trolley 347, through the magnet track shoe windings, to ground, that is independent of the controller contact members 284 and 285, and of the resistor 393, and which extends from the trolley 347, through conductor 348, contact member 282 of the switch 277, conductor 394, the windings of the track shoe magnets to ground at 395. The windings of the track shoes are therefore immediately energized to their full extent and remain so energized so long as the pressure in the safety control pipe 16 remains below the predetermined value necessary to maintain the switch devices 274 and 277 in their circuit closing positions.

Upon a reduction in pressure within the piston chamber 161 of the emergency portion of the brake valve device 9 caused by venting fluid under pressure from the safety control pipe 16, the piston 159, the rod 156 and the block 155 will be forced toward the left by the spring 162, the left end of the block engaging the lower end of the operating lever 151 of the brake valve device 9 causing it to rotate in a clockwise direction about the shaft 101, thus moving the plunger 143 toward the right and effecting the supply of fluid under pressure from the main reservoir pipe 54 to the pressure chamber 109 and to the piston chamber 165 of the relay valve devices 7 and 8 to effect an application of the fluid pressure brake in the manner above described. The degree of movement of the operating lever 151 will be such as to effect a maximum degree of application of the fluid pressure brakes.

The reduction in pressure in the chamber 228 of the retardation controller device 17 causes the spring 229 to force the stem 226 and the lever 223 toward the right, the upper end of the lever 223 engaging the cap 220 and forcing it toward the right to compress the spring 217 to a maximum amount to thus change the setting of the retardation controller device 17 to cause it to so control the magnet valve portions 12 and 23 as to effect a maximum degree of retardation of the vehicle. It will be noted that when an emergency application of the brake is made, as the result of venting fluid under pressure from the safety control pipe 16, the retardation controller 17 controls the degree of application of the fluid pressure brake and of the dynamic brake, but the track shoe brake, is automatically applied to its full extent, independently of the operation of the retardation controller 17. If it should be desired that the retardation controller control all three brakes, during emergency application of the brakes as well as during service application thereof, this result may be effected by omitting the pressure operated switch devices 274 and 277 and permitting the control of the track shoe brakes by the pressure operated controller 24 during emergency application of the brakes the same as described for service application thereof.

An emergency application of the brakes may also be effected independently of the operator by reduction in safety control pipe pressure, for any reason, such as the operation of the conductor valve device 289, the breaking of the safety control pipe, or the venting of fluid under pressure from the safety control pipe 16 through the cut-off valve device 283, the foot valve device 287, and the controller handle device 286, upon simultaneous release of pressure on the foot pedal 312 of the foot valve device and from the handle 291 of the controller handle device. If downward pressure is exerted on the handle 291 of the controller handle device 286 and on the foot pedal 312 of the foot valve device 287, urging these levers to their lower or illustrated positions, the chamber 309 of the foot valve device is charged by the flow of fluid under pressure from the safety control pipe 16 through chamber 315 of the cut-off valve device 288 past the unseated diaphragm valve 314 through the chamber 316 and the pipe 311 to the chamber 309 of the foot valve device. Since the lever 312 is in its lower position the diaphragm 307 is pressed against the rib seat 308, closing communication between the chambers 309 and 305 in the foot valve device. The chamber 305 is charged from the main reservoir pipe 54 through chamber 306 of the pilot valve portion of the controller handle device 286, past the pilot valve 299 in its lower seated position, through chamber 302 and pipe 304.

If the operator relieves pressure from the lever 312 of the foot valve device while maintaining pressure on the handle 291 of the controller handle device the diaphragm valve 307 will be unseated thus connecting the pipe 304 to the pipe 311. Since both these pipes are charged to main reservoir pipe pressure this operation has no effect on the brake system. If, while maintaining pressure on the lever 312 of the foot valve device, pressure is relieved from the handle 291 of the controller handle device, the pilot valve device 299 will be moved upwardly to its upper seated position by the action of the spring 295 which will move the pin 294 downwardly against the right hand end of the lever 296, thus venting the pipe 304 through the chamber 302 and the exhaust port 303, and closing communication from the main reservoir pipe 54 to the pipe 304 through the chamber 302 in the pilot valve portion of the controller handle device. This action is also ineffective to vent the safety control pipe 16, since communication between the controller handle device 286 and the safety control pipe 16 is closed by the foot valve device 287. Should, however, the operator relieve pressure from both the foot valve device 287 and the controller handle device 286 at the same time, fluid under pressure would be vented from the safety control pipe 16, through chambers 315 and 316 of the cut-off valve device 288, through pipe 311, past the unseated valve 307 of the foot valve device 287, through pipe 304, the pilot valve chamber 302 and the exhaust passage 303 to the atmosphere, thus effecting an emergency application of the brakes in the manner above described.

As the brake cylinder pressure builds up, fluid under pressure flows from the brake cylinder pipe 163 to the chamber 325 in the cut-off valve device until the pressure below the valve 319 has become sufficient to move the valve upwardly to its upper seat 323 against the force of the spring 322, thus closing communication from the chamber 318 to the atmosphere, and effecting a pressure within the chamber 318 corresponding to brake cylinder pressure to force the diaphragm 317 and the valve 314 downwardly to cut off communication between the safety control pipe 16 and the pipe 311. The cut-off valve device 288 is so adjusted as to close communication between the safety control pipe 16 and the pipe 311 upon an increase in brake cylinder pressure to a value corresponding to a moderate service application of the brakes. The operator may, therefore, after effecting such a moderate service application of the brakes, relieve pressure from both the handle 291 of the controller handle device, and from the lever 312 of the foot valve device, without effecting an emergency application of the brakes.

While one preferred embodiment of my invention has been illustrated and described it will be apparent to those skilled in the art that many modifications and changes in the apparatus and circuits illustrated may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, an electrical braking means, manually operable means for controlling the supply of fluid under pressure to said brake cylinder and for controlling the application of said electrical braking means, and a retardation controller responsive to the rate of deceleration of the vehicle for regulating the degree of fluid pressure in said brake cylinder and the degree of application of said electrical braking means.

2. In a brake equipment for vehicles, in combination, fluid pressure braking means, magnet track braking means, dynamic braking means, a brake valve device for controlling the application and release of said fluid pressure braking means, a controller for controlling the application and release of said magnet track braking means and said dynamic braking means, manually operable means for controlling the operation of said brake valve device and of said controller for effecting a gradual increase in the degree of application of said brakes, and a retardation controller responsive to the rate of deceleration of said vehicle for limiting the degree of application of said several brakes to effect a desired rate of retardation of the vehicle.

3. In a brake equipment for vehicles, in combination, fluid pressure braking means, magnet track braking means, dynamic braking means, means operable for controlling the application and release of said several braking means comprising a brake valve device for controlling said fluid pressure braking means, a controller for controlling the application and release of said magnet track braking means and of said dynamic braking means, manually operable means for governing the operation of said controller and said brake valve device, and a retardation controller responsive to the rate of deceleration of said vehicle for controlling the operation of said controller and of said brake valve device to limit the deceleration of the vehicle to a desired value.

4. In a brake equipment for vehicles, in combination, fluid pressure braking means, magnet track braking means, dynamic braking means, manually operable means for controlling the application and release of the brakes, a brake valve device for controlling the application of said fluid pressure brake in response to the movement of said manually operable means, a controller responsive to the movement of said manually operable means from its release position for controlling said magnet track braking means and said dynamic braking means to effect a gradually increasing degree of application of said two braking means and for controlling said brake valve device to effect a gradually increasing degree of application of said fluid pressure braking means, and a retardation controller responsive to a desired rate of retardation of the vehicle for limiting the degree of application of said several brakes.

5. In a brake equipment, in combination, a fluid pressure braking means, magnetic track shoe braking means, dynamic braking means, a brake valve device for controlling the application and release of said fluid pressure braking means, a fluid pressure operated electric controller for controlling the application and release of said track shoe braking means and of said dynamic braking means, and a manually operated controller for controlling the operation of said brake valve device and the control of fluid under pressure to said fluid pressure operated electrical controller.

6. In a brake equipment for vehicles, in combination, fluid pressure braking means, magnetic track braking means, dynamic braking means, a brake valve device for controlling the application and release of said fluid pressure braking means, a fluid pressure operated electric controller for controlling the application and release of said track shoe braking means and of said dynamic braking means, a manually operable controller for controlling the operation of said brake valve device and for controlling the supply of fluid under pressure to said fluid pressure operated electric controller, and means for operating the brake valve device in accordance with the operation of said fluid pressure operated electric controller for increasing the degree of application of the fluid pressure braking means independently of said manually operable controller.

7. In a brake equipment for vehicles, in combination, a fluid pressure braking means, magnetic track shoe braking means, dynamic braking means, a brake valve device for controlling the application and release of said fluid pressure braking means, a fluid pressure operated electric controller for controlling the application and release of said track shoe braking means and of said dynamic braking means, and a manually operable controller for initiating the operation of said brake valve device and of said fluid pressure operated electric controller, said electric controller being operable to effect a gradually increasing degree of application of all three braking means.

8. In a brake equipment for vehicles, in combination, a fluid pressure braking means, magnetic track shoe braking means, dynamic braking means, a brake valve device for controlling the application and release of said fluid pressure braking means, a fluid pressure operated electric controller for controlling the application and release of said track shoe braking means and of said dynamic braking means, and a manually operable controller for controlling the operation of said brake valve device in accordance with the degree of movement of said controller from its release position and for initiating the operation of said electric controller to effect an application of the track shoe braking means and of the dynamic braking means.

9. In a brake equipment for vehicles, in combination, a fluid pressure braking means, an electrical braking means, a brake valve device for controlling the application and release of said fluid pressure braking means, an electric controller for controlling the application and release of said electric braking means, and a manually operable controller for controlling the operation of said brake valve device in accordance with the degree of movement of said manually operable controller from its release position and for governing pneumatically the operation of said electric controller for controlling the application and release of said electric brake.

10. In a brake equipment for vehicles, in combination, a fluid pressure braking means, an electrical braking means, a brake valve device for controlling the application and release of said fluid pressure braking means, an electric controller for controlling the application and release of said electric braking means, a manually operable controller for effecting the operation of said brake valve device in accordance with the degree of movement of said manually operable controller from its release position and for initiating the operation of said electric controller for effecting a gradually increasing degree of application of said electrical braking means, and a retardation controller responsive to the rate of deceleration of the vehicle for controlling the degree of application of said fluid pressure brake and of said electric brake to effect a desired rate of retardation of the vehicle.

11. In a brake equipment for vehicles, in combination, a fluid pressure braking means, an electrical braking means, a brake valve device for controlling the application and release of said fluid pressure braking means, an electric controller for controlling the application and release of said electrical braking means, a manually operable controller for effecting the operation of said brake valve device in accordance with the degree of movement of said manually operable controller from its release position for effecting a corresponding degree of application of the fluid pressure braking means and for initiating the operation of said electric controller for effecting a gradually increasing degree of application of said electrical braking means, means operable upon operation of said electric controller beyond a predetermined position, depending upon the position of the manually operable controller, for effecting a further operation of said brake valve device to effect an application of the fluid pressure braking means in excess of that called for by the position of the manually operable controller, and a retardation controller responsive to the rate of deceleration of the vehicle for controlling the degree of application of said fluid pressure braking means and of said electrical braking means for effecting a desired rate of retardation of the vehicle.

12. In a brake equipment for vehicles, in combination, fluid pressure braking means, magnetic track shoe braking means, dynamic braking means, a brake valve device for controlling the application and release of said fluid pressure braking means, an electric controller for controlling the application and release of said track shoe braking means and of said dynamic braking means, a manually operable controller for effecting the operation of said brake valve device in accordance with the degree of movement of said manually operable controller from its release position to effect a corresponding degree of application of the fluid pressure brake and for initiating the operation of said electric controller for effecting a gradually increasing degree of application of said track shoe braking means and of said dynamic braking means, and a retardation controller responsive to the rate of deceleration of the vehicle for controlling the operation of said electric controller and for limiting the degree of application of the fluid pressure brake independently of the operation of said brake valve device to effect a desired rate of retardation of the vehicle.

13. In a brake equipment for vehicles, in combination, fluid pressure braking means comprising a brake cylinder, magnetic track shoe braking means, dynamic braking means, a brake valve device for controlling the supply and release of fluid under pressure to and from said brake cylinder, a fluid pressure operated electric controller for controlling the application and release of said track shoe braking means and of said dynamic braking means, a manually operable controller for operating said brake valve device to effect the supply of fluid under pressure to said brake cylinder in accordance with the movement of said manually operable controller from its release position, and for effecting the supply of fluid under pressure to said fluid pressure operated electric controller for effecting a gradually increasing degree of application of said magnetic track shoe brake and of said dynamic braking means, and a retardation controller responsive to the rate of deceleration of the vehicle for limiting the supply of fluid under pressure to said fluid pressure operated electric controller and to said brake cylinder to effect a desired rate of retardation of the vehicle.

14. In a brake equipment for vehicles, in combination, fluid pressure braking means comprising a brake cylinder, magnetic track shoe braking means, dynamic braking means, a brake valve device for controlling the supply of fluid under pressure to and the release of fluid under pressure from said brake cylinder, a fluid pressure operated electric controller for controlling the application and release of said track shoe braking means and of said dynamic braking means, a manually operable controller for controlling said brake valve device for effecting the supply of fluid under pressure to said brake cylinder in accordance with the degree of movement of said manually operable controller from its release position and for initiating the supply of fluid under pressure to said fluid pressure operated electric controller for effecting a gradually increasing degree of application of said track shoe braking means and of said dynamic braking means, means effective upon movement of said electric controller beyond a predetermined position, determined by the position of the manually operable controller, for effecting operation of said brake valve device to cause a supply of fluid under pressure to said brake cylinder in excess of that called for by the position of the manually operable controller, and a retardation controller responsive to the rate of deceleration of the vehicle for controlling the supply of fluid under pressure to said fluid pressure operated electric controller and to said brake cylinder to limit the degree of application of said several braking means to effect a desired rate of retardation of the vehicle.

15. In a brake equipment for vehicles, in combination, fluid pressure braking means, an electric braking means, manually operable means for controlling the application and release of the brakes, a retardation controller for limiting the degree of application of said several braking means to effect a desired rate of retardation of the vehicle, and means responsive to the movement of said manually operable controller beyond a predetermined position from its release position to vary the setting of said retardation controller.

16. In a brake equipment for vehicles, in combination, fluid pressure braking means, magnetic track shoe braking means, dynamic braking means, manually operable means for controlling the application and release of said several braking means, a retardation controller for limiting the degree of application of said several braking means to effect a desired rate of retardation of the vehicle, and means responsive to the position of said manually operable controller for determining the setting of said retardation controller.

17. In a brake equipment for vehicles, in combination, fluid pressure braking means, an electric braking means, manually operable means for controlling the application and release of said several braking means, a retardation controller for limiting the degree of application of said several braking means to effect a desired rate of retardation of the vehicle, a safety control pipe, means responsive to a predetermined reduction in safety control pipe pressure for effecting an emergency supply of fluid under pressure to said brake cylinder, means responsive to a predetermined reduction in safety control pipe pressure for effecting an emergency application of said electric braking means, and means responsive to a predetermined reduction in safety control pipe pressure for changing the setting of said retardation controller to effect a maximum rate of retardation of the vehicle, said retardation controller being effective, during emergency application of the brakes, to control the brake cylinder pressure and the degree of application of said electrical braking means.

18. In a brake equipment for vehicles, in combination, fluid pressure braking means, magnetic track shoe braking means, dynamic braking means, manually operable means for controlling the application and release of said several braking means, a retardation controller for limiting the degree of application of said several braking means to effect a desired rate of retardation of the vehicle during a service application of the brakes, means responsive to an emergency application of the brakes for effecting the application of said several braking means independently of the position of said manually operable controller and for effecting a maximum degree of application of one of said several braking means independently of said retardation controller.

19. In a brake equipment for vehicles, in combination, fluid pressure braking means, magnetic track shoe braking means, dynamic braking means, manually operable means for controlling the application and release of said several braking means, a retardation controller for limiting the degree of application of said several braking means to effect a desired rate of retardation during a service application of said brakes, and for limiting the degree of application of a plurality of said braking means to effect a greater desired rate of retardation of the vehicle during an emergency application of the brakes.

20. In a brake equipment for vehicles, in combination, fluid pressure braking means, magnetic track shoe braking means, dynamic braking means, manually operable means for controlling the application and release of said several braking means, a retardation controller for limiting the degree of application of said several braking means to effect a desired rate of retardation of the vehicle during a service application of said brakes, and for limiting the degree of application of a plurality of said braking means to effect a greater desired rate of retardation of the vehicle during an emergency application of the brakes, and means for effecting a maximum degree of application of one of said several braking means independently of said manually operable controller or of said retardation controller.

21. In a fluid pressure brake for vehicles, in combination, a brake cylinder, an electric braking means, a brake valve device for controlling the supply of fluid under pressure to said brake cylinder, a fluid pressure operated electric controller for controlling the application of said electrical braking means, a manually operable controller for controlling said brake valve device and for controlling the supply of fluid under pressure to said fluid pressure operated electric controller, a magnet valve device for limiting the supply of fluid under pressure to said brake cylinder and a magnet valve device for limiting the supply of fluid under pressure to said fluid pressure operated electric controller, and a retardation controller for controlling the operation of said magnet valve devices for effecting a desired rate of retardation of said vehicle.

22. In a fluid pressure brake for vehicles, in combination, a brake cylinder, an electric braking means, a brake valve device for controlling the supply of fluid under pressure to said brake cylinder, a fluid pressure operated electric controller for controlling the application of said electric braking means, a manually operable controller for controlling said brake valve device and for controlling the supply of fluid under pressure to said fluid pressure operated electric controller, a magnet valve device for limiting the supply of fluid under pressure to said brake cylinder as supplied through said brake valve device and for releasing pressure from said brake cylinder, a magnet valve device for limiting the supply of fluid under pressure to said fluid pressure operated electric controller and for releasing fluid under pressure therefrom, a retardation controller for controlling the operation of said magnet valve devices for effecting a desired rate of retardation of the vehicle, and means for insuring the supply of fluid under pressure at a predetermined minimum value to said brake cylinder and to said fluid pressure operated electric controller upon the movement of said manually operable controller to a brake applying position independently of the operation of said magnet valve devices.

23. In a fluid pressure brake for vehicles, in combination, a brake cylinder, an electric braking means, a brake valve device for controlling the supply of fluid under pressure to said brake cylinder, a fluid pressure operated electric controller for controlling the application of said electric braking means, a manually operable controller for controlling said brake valve device and for controlling the supply of fluid under pressure to said fluid pressure operated electric controller, a magnet valve device for limiting the supply of fluid under pressure to said brake cylinder as supplied through said brake valve device and for releasing pressure from said brake cylinder, a magnet valve device for limiting the supply of fluid under pressure to said fluid pressure operated electric controller and for releasing fluid under pressure therefrom, a retardation controller for controlling the operation of said magnet valve devices for effecting a desired rate of retardation of the vehicle, and means for insuring the supply of fluid under pressure at a predetermined minimum value to said brake cylinder and to said fluid pressure operated electric controller upon the movement of said manually operable controller to a brake applying position independently of the operation of said retardation controller, and for preventing the release of fluid under pressure from said fluid pressure operated electric controller and from said brake cylinder by said retardation controller below a predetermined pressure.

24. In a brake equipment for vehicles, in combination, a fluid pressure braking means, magnetic track shoe braking means, dynamic braking means, a brake valve device for controlling the supply of fluid under pressure to said fluid pressure braking means, an electric controller for controlling the application and release of said magnet track shoe braking means and of said dynamic braking means, manually operable means for controlling the operation of said brake valve device and of said electric controller for controlling the application and release of said several braking means, a safety control pipe and means responsive to a predetermined reduction in safety control pipe pressure for effecting the supply of fluid under pressure to said fluid pressure braking means, and pressure operated valve means responsive to a predetermined reduction in safety control pipe pressure for controlling the operation of said electric controller to effect an emergency application of the brakes.

25. In a brake equipment for vehicles, in combination, fluid pressure braking means, magnet track shoe braking means, dynamic braking means, a brake valve device for controlling the supply of fluid under pressure to said fluid pressure braking means, a fluid pressure operated electric controller for controlling the application and release of said magnet track shoe braking means and said dynamic braking means, a manually operable controller for controlling the operation of said brake valve device and of said fluid pressure operated electric controller for effecting a service application of the brakes, a safety control pipe, and means for effecting an emergency application of the brakes comprising means for venting said safety control pipe, means responsive to a predetermined reduction in safety control pipe pressure for effecting the supply of fluid under pressure to said fluid pressure brake, independently of said manually operable controller, means responsive to a predetermined reduction in safety control pipe pressure for effecting the application of said magnet track shoe brake independently of the operation of said manually operable controller, and means responsive to a predetermined reduction in safety control pipe pressure for effecting an operation of said electric controller to effect an emergency application of said dynamic braking means.

26. In a vehicle brake system, in combination, an electric brake device having a winding and being operable to produce a braking effect according to the degree of current supplied to said winding, a circuit for supplying current to said winding, resistance means in said circuit, control means operable in one direction to cut out said resistance means and operable in a reverse direction to cut in said resistance means, a retardation controller device operated according to the rate of retardation of the vehicle, and means responsive to operation of said retardation controller device at a chosen rate of retardation for causing said control means to be operated to cut in said resistance means and responsive to a lower rate of retardation for causing said control means to be operated to cut out said resistance means.

27. In a vehicle brake system, in combination, a magnetic rail brake shoe, fluid pressure operated means for controlling engagement of said shoe with a track rail, said fluid pressure operated means being operable to effect disengagement of said shoe from said rail when fluid under pressure is supplied thereto and to effect engagement with said rail when fluid under pressure is released therefrom, and electroresponsive valve means operable when deenergized to effect the supply of fluid under pressure to said fluid pressure operated means and operable when energized to effect a release of fluid under pressure therefrom.

28. In a vehicle brake system, in combination, a magnetic rail brake shoe, fluid pressure operated means for controlling engagement of said shoe with a track rail, said fluid pressure operated means being operable to effect disengagement of said shoe from said rail when fluid under pressure is supplied thereto, and to effect engagement with said rail when fluid under pressure is released therefrom, electroresponsive means operable when deenergized to effect a supply of fluid under pressure to said fluid pressure operated means and operable when energized to effect a release of fluid under pressure therefrom, means for controlling the energization of said electroresponsive valve means, means for controlling the energization of said magnetic rail brake shoe, and common means for controlling said last two named means.

29. In a vehicle brake system, in combination, a magnetic rail brake shoe, means for raising said rail brake shoe from engagement with said rail and for lowering said rail brake shoe into engagement therewith comprising a bell crank lever for supporting the rail brake shoe and fluid pressure operated means operatively connected to said bell crank lever, said fluid pressure operated means being operable to effect disengagement of said shoe from said rail when fluid under pressure is supplied thereto and to effect the engagement of said shoe with said rail when fluid under pressure is released therefrom, and electro-responsive valve means operable when deenergized to effect the supply of fluid under pressure to said fluid pressure operated means and operable when energized to effect a release of fluid under pressure therefrom.

30. In a vehicle brake system, in combination, a magnetic track brake shoe, means for raising said rail brake shoe from engagement with said rail and for lowering said rail brake shoe into engagement therewith comprising a bell crank lever for supporting the rail brake shoe and fluid pressure operated means operatively connected to said bell crank lever, said fluid pressure operated means being operable to effect the disengagement of said shoe from said track rail when fluid under pressure is supplied thereto and to effect engagement of said shoe with said track rail when fluid under pressure is released therefrom, and electroresponsive valve means operable when deenergized to effect the supply of fluid under pressure to said fluid pressure operated means and operable when energized to effect a release of fluid under pressure therefrom, means for controlling the energization of said electroresponsive valve means, means for controlling the energization of said magnetic rail brake shoe, and common means for controlling the said last two named means.

31. In a vehicle brake system, in combination, a magnetic rail brake shoe, means for raising said rail brake shoe from engagement with said rail and for lowering said rail brake shoe into engagement therewith comprising a bell crank lever for supporting the rail brake shoe and fluid pressure operated means operatively connected to said bell crank lever, said fluid pressure operated means being operable to effect disengagement of said shoe from said rail when fluid under pressure is supplied thereto and to effect the engagement of said shoe with said rail when fluid under pressure is released therefrom, and electro-responsive valve means operable to control the supply of fluid under pressure to said fluid pressure operated means and the release of fluid under pressure therefrom.

32. In a vehicle brake system, in combination, a magnetic rail brake shoe, means for raising said rail brake shoe from engagement with said rail and for lowering said rail brake shoe into engagement therewith comprising a bell crank lever for supporting the rail brake shoe and fluid pressure operated means operatively connected to said bell crank lever, said fluid pressure operated means being operable to effect the disengagement of said shoe from said rail when fluid under pressure is supplied thereto and to effect the engagement of said shoe with said rail when fluid under pressure is released therefrom, and electroresponsive valve means operable to control the supply of fluid under pressure to said fluid pressure operated means and the release of fluid under pressure therefrom, means for controlling the energization of said electroresponsive valve means, means for controlling the energization of said magnetic rail brake shoe, and common means for controlling said last two named means.

33. In a vehicle brake system, in combination, vehicle driving motors adapted at one time to drive the vehicle and at another time to operate as dynamic brakes, a power controller for supplying current to said motors when driving the vehicle, magnetic track brake means, and a brake controller operable to application position to simultaneously effect an application of said magnetic track brake means and to disconnect said motors from said power controller and connect said motors in a dynamic braking circuit.

ELLIS E. HEWITT.